(12) United States Patent
Wei et al.

(10) Patent No.: US 9,906,011 B2
(45) Date of Patent: Feb. 27, 2018

(54) ELECTRONIC DEVICE AND OVER-CURRENT PROTECTION CIRCUIT THEREOF

(71) Applicant: ScienBiziP Consulting (Shen Zhen)Co., Ltd., Shenzhen (CN)

(72) Inventors: Ming-Tao Wei, Wuhan (CN); Qi-Sheng Xu, Wuhan (CN); Sung-Kuo Ku, New Taipei (TW)

(73) Assignee: ScienBiziP Consulting(Shenzhen)Co., Ltd., Shenzhen (CN)

( * ) Notice: Subject to any disclaimer, the term of this patent is extended or adjusted under 35 U.S.C. 154(b) by 330 days.

(21) Appl. No.: 14/715,229

(22) Filed: May 18, 2015

(65) Prior Publication Data
US 2016/0226237 A1  Aug. 4, 2016

(30) Foreign Application Priority Data
Jan. 31, 2015 (CN) .......................... 2015 1 0049599

(51) Int. Cl.
*H02H 3/08* (2006.01)
*H02H 9/02* (2006.01)
(52) U.S. Cl.
CPC ................. *H02H 3/08* (2013.01); *H02H 9/02* (2013.01)

(58) Field of Classification Search
CPC .................................. H02H 3/08; H02H 9/02
See application file for complete search history.

(56) References Cited

U.S. PATENT DOCUMENTS

| 4,740,883 A * | 4/1988 | McCollum | H02H 3/0935 307/26 |
| 6,127,741 A * | 10/2000 | Matsuda | H02J 1/08 307/10.6 |
| 2009/0039829 A1* | 2/2009 | Zhu | H02J 7/0054 320/114 |

* cited by examiner

*Primary Examiner* — Zeev V Kitov
(74) *Attorney, Agent, or Firm* — ScienBiziP, P.C.

(57) ABSTRACT

An over-current protection circuit includes a first connector, a first current measuring unit, a first switch unit, a first resistor unit, and a second connector. The first connector is electrically coupled to a power supply unit (PSU). When a current of the first resistor unit measured by the first current measuring unit is less than a first reference value, the first switch unit is turned on, and the second connector receives a first power supply from the PSU. When the current of the first resistor unit measured by the first current measuring unit is greater than or equal to the first reference value, the first switch unit is turned off, and the second connector does not receive the first power supply from the PSU.

12 Claims, 2 Drawing Sheets

ELECTRONIC DEVICE AND OVER-CURRENT PROTECTION CIRCUIT THEREOF

FIELD

The subject matter herein generally relates to electronic devices and particularly to an electronic device with an over-current protection circuit.

BACKGROUND

In the process of testing computer motherboards, power output from power supply powers the computer motherboards. If the large current, caused by a short circuit, enters the computer motherboards, electronic components on the computer motherboards may be damaged.

BRIEF DESCRIPTION OF THE DRAWINGS

Implementations of the present technology will now be described, by way of examples only, with reference to the attached figures.

DETAILED DESCRIPTION

Figure 1:
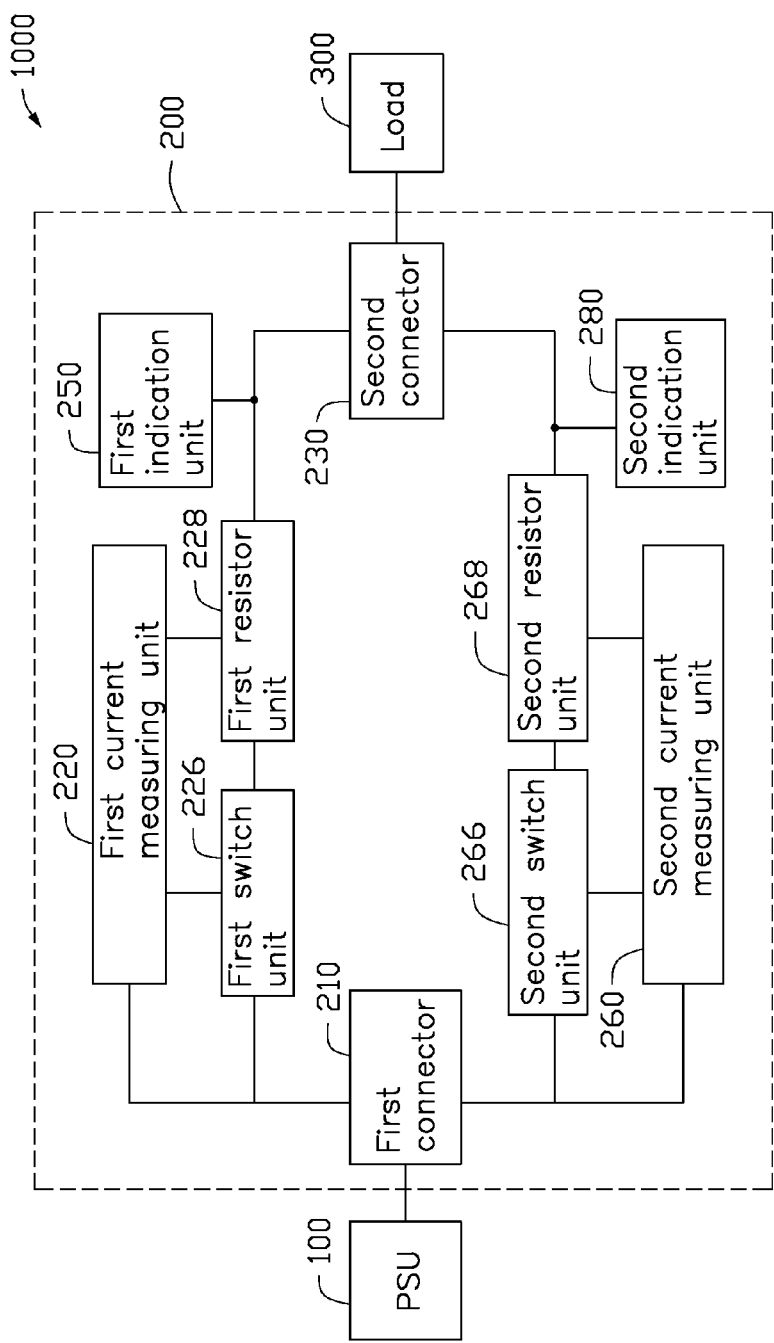
FIG. 1 is a block diagram of an embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

FIG. 1 illustrates an embodiment of an electronic device 1000. The electronic device 1000 can comprise a power supply unit (PSU) 100, an over-current protection circuit 200, and a load 300. The PSU 100 powers the load 300 through the over-current protection circuit 200. The over-current protection circuit 200 is configured to prevent large current received by power supplies output from the PSU 100 from entering the load 300, and to protect the load 300 from being damaged by the large current. In at least one embodiment, the electronic device 1000 can be a computer, a server, a data center, or a mobile phone, the load 300 can be a central processing unit of the computer, the server, the data center, or the mobile phone.

The over-current protection circuit 200 can comprise a first connector 210, a first current measuring unit 220, a first switch unit 226, a first resistor unit 228, a second connector 230, a first indication unit 250, a second current measuring unit 260, a second switch unit 266, a second resistor unit 268, and a second indication unit 280. The first connector 210 is electrically coupled to the PSU 100, the first current measuring unit 220, the first switch unit 226, the second current measuring unit 260, and the second switch unit 266. The first current measuring unit 220 is electrically coupled to the first switch unit 226 and the first resistor unit 228. The first switch unit 226 is electrically coupled to the second connector 230 through the first resistor unit 228. The second connector 230 is electrically coupled to the first indication unit 250 and the load 300. The second current measuring unit 260 is electrically coupled to the second switch unit 226 and the second resistor unit 268. The second switch unit 266 is electrically coupled to the second connector 230 through the second switch unit 268. The second indication unit 280 is electrically coupled to the second connector 230.

In at least one embodiment, the PSU 100 outputs a first power supply 5V and a second power supply 12V (that is, the PSU 100 outputs two power supplies). The over-current protection circuit 200 is configured to prevent large current received by the first power supply 5V and the second power supply 12V from entering the load 300, and protect the load 300 from being damaged by the large current. Therefore, the over-current protection circuit 200 comprises two current measuring units, two switch units, two resistor units, and two indication units. In other embodiments, a number of power supplies output from a power supply unit can be adjusted according to actual need, and number of current measuring units, switch units, resistor units, and indication units comprised in an over-current protection circuit can be adjusted according to the number of power supplies output from the power supply unit.

Figure 2:
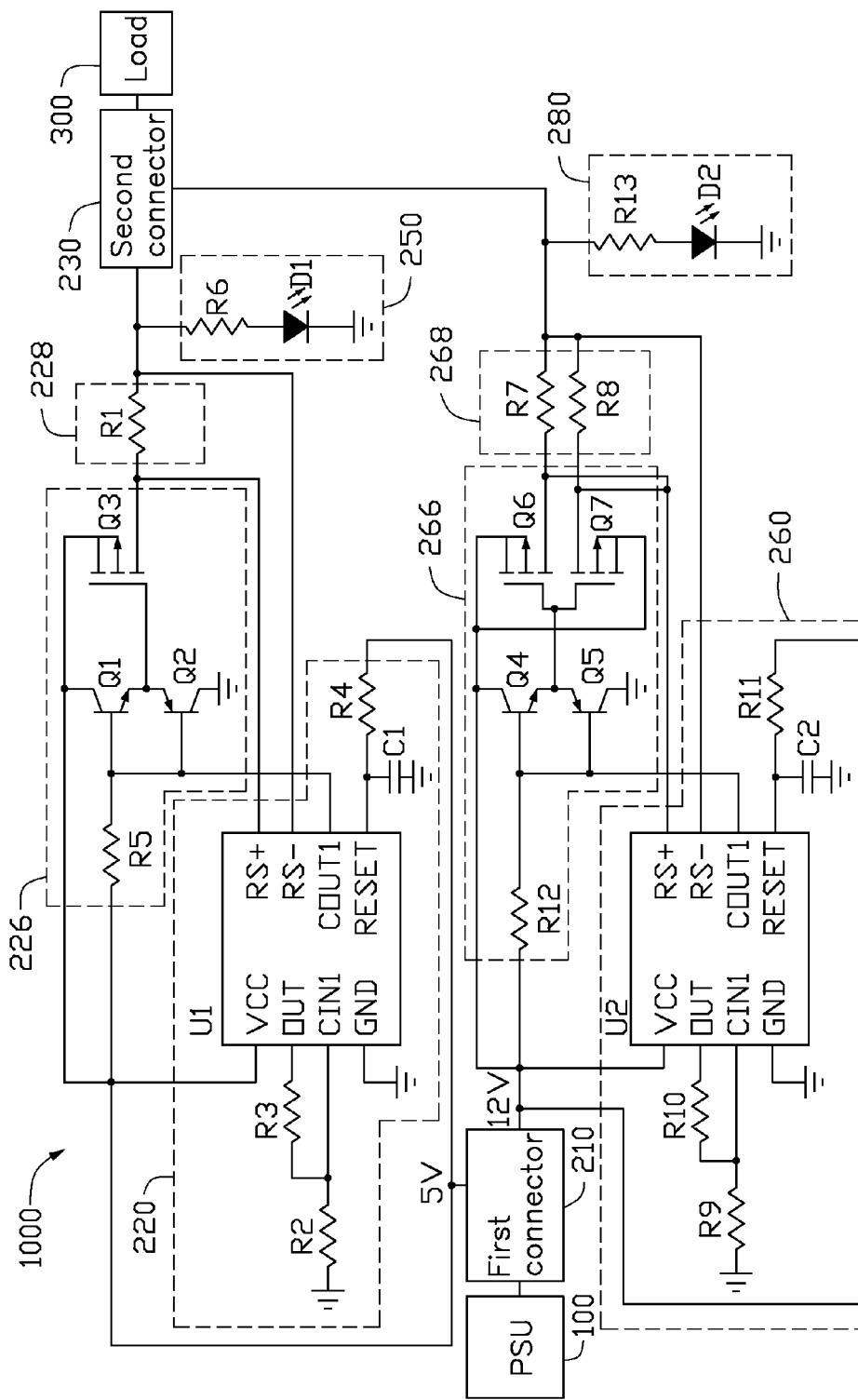
FIG. 2 is a circuit diagram of the electronic device of FIG. 1.

FIG. 2 illustrates an embodiment of the over-current protection circuit 200. The first current measuring unit 220 can comprises a first current detector U1, three resistors R2-R4, and a capacitor C1. The first current detector U1 can comprise a first input pin RS+, a second input pin RS−, a third input pin CIN1, a first output pin OUT, a second output pin COUT1, a reset pin RESET, a power pin VCC, and a ground pin GND. The first resistor unit 228 can comprise a resistor R1. The first input pin RS+ of the first current detector U1 is electrically coupled to a first terminal of the resistor R1. The second input pin RS− of the first current detector U1 is electrically coupled to a second terminal of the resistor R1. The third input pin CIN1 of the first current detector U1 is electrically coupled to a ground through the resistor R2. The first output pin OUT of the first current detector U1 is electrically coupled to the third input pin CIN1 of the first current detector U1 through the resistor R3. The second output pin COUT1 of the first current detector U1 is electrically coupled to the first switch unit 226. The reset pin RESET of the first current detector U1 is electrically coupled to the first connector 210 through the resistor R4, to receive the first power supply 5V from the PSU 100. The reset pin RESET of the first current detector U1 is further electrically coupled to the ground through the capacitor C1. The power pin VCC of the first current detector U1 is electrically coupled to the first connector 210 to receive the first power supply 5V from the PSU 100. The ground pin GND of the first current detector U1 is electrically coupled to the ground.

The first switch unit 226 can comprise three electronic switches Q1-Q3 and a resistor R5. Each of the electronic switches Q1-Q3 can comprise a first terminal, a second terminal, and a third terminal. The first terminal of the electronic switch Q1 is electrically coupled to the second output pin COUT1 of the first current detector U1, and is electrically coupled to the first connector 210 through the resistor R5 to receive the first power supply 5V from the PSU 100. The second terminal of the electronic switch Q1 is electrically coupled to the first connector 210 to receive the first power supply 5V from the PSU 100. The first terminal of the electronic switch Q2 is electrically coupled to the first terminal of the electronic switch Q1. The second terminal of the electronic switch Q2 is electrically coupled to a ground. The third terminal of the electronic switch Q2 is electrically coupled to the third terminal of the electronic switch Q1. The first terminal of the electronic switch Q3 is electrically coupled to the third terminal of the electronic switch Q1. The second terminal of the electronic switch Q3 is electrically coupled to the first terminal of the resistor R1. The third terminal of the electronic switch Q3 is electrically coupled to the first connector 210 to receive the first power supply 5V from the PSU 100.

The first indication unit 250 can comprise a light-emitting diode D1 and a resistor R6. An anode of the light-emitting diode D1 is electrically coupled to the second terminal of the resistor R1 through the resistor R6, and is electrically coupled to the second connector 230 through the resistor R6. A cathode of the light-emitting diode D1 is electrically coupled to the ground.

The second current measuring unit 260 can comprise a second current detector U2, three resistors R9-R11, and a capacitor C2. The second current detector U2 can comprise a first input pin RS+, a second input pin RS−, a third input pin CIN1, a first output pin OUT, a second output pin COUT1, a reset pin RESET, a power pin VCC, and a ground pin GND. The second resistor unit 268 can comprise two resistors R7 and R8. The first input pin RS+ of the second current detector U2 is electrically coupled to a first terminal of the resistor R7, and is electrically coupled to a first terminal of the resistor R8. The second input pin RS− of the second current detector U2 is electrically coupled to a second terminal of the resistor R7, and is electrically coupled to a second terminal of the resistor R8. The third input pin CIN1 of the second current detector U2 is electrically coupled to the ground through the resistor R9. The first output pin OUT of the second current detector U2 is electrically coupled to the third input pin CIN1 of the second current detector U2 through the resistor R10. The second output pin COUT1 of the second current detector U2 is electrically coupled to the second switch unit 266. The reset pin RESET of the second current detector U2 is electrically coupled to the first connector 210 through the resistor R11, to receive the second power supply 12V from the PSU 100. The reset pin RESET of the second current detector U2 is further electrically coupled to the ground through the capacitor C2. The power pin VCC of the second current detector U2 is electrically coupled to the first connector 210 to receive the second power supply 12V from the PSU 100. The ground pin GND of the second current detector U2 is electrically coupled to the ground.

The second switch unit 266 can comprise four electronic switches Q4-Q7 and a resistor R12. Each of the electronic switches Q4-Q7 can comprise a first terminal, a second terminal, and a third terminal. The first terminal of the electronic switch Q4 is electrically coupled to the second output pin COUT1 of the second current detector U2, and is electrically coupled to the first connector 210 through the resistor R12 to receive the second power supply 12V from the PSU 100. The second terminal of the electronic switch Q4 is electrically coupled to the first connector 210 to receive the second power supply 12V from the PSU 100. The first terminal of the electronic switch Q5 is electrically coupled to the first terminal of the electronic switch Q4. The second terminal of the electronic switch Q5 is electrically coupled to a ground. The third terminal of the electronic switch Q5 is electrically coupled to the third terminal of the electronic switch Q4. The first terminal of the electronic switch Q6 is electrically coupled to the third terminal of the electronic switch Q4. The second terminal of the electronic switch Q6 is electrically coupled to the first terminal of the resistor R7. The third terminal of the electronic switch Q6 is electrically coupled to the first connector 210 to receive the second power supply 12V from the PSU 100. The first terminal of the electronic switch Q7 is electrically coupled to the third terminal of the electronic switch Q4. The second terminal of the electronic switch Q7 is electrically coupled to the first terminal of the resistor R8. The third terminal of the electronic switch Q7 is electrically coupled to the first connector 210 to receive the second power supply 12V from the PSU 100.

The second indication unit 280 can comprise a light-emitting diode D2 and a resistor R13. An anode of the light-emitting diode D2 is electrically coupled to the second terminal of the resistor R7 through the resistor R13, is electrically coupled to the second terminal of the resistor R8 through the resistor R13, and is electrically coupled to the second connector 230 through the resistor R6. A cathode of the light-emitting diode D2 is electrically coupled to the ground.

In operation, the PSU 100 supplies the first power supply 5V and the second power supply 12V to the load 300 through the over-current protection circuit 200. The first current detector U1 measures current passing through the first resistor R1 (that is current of the first resistor R1), and controls the first switch unit 226 to be turned on and turned off, according to the measured current of the resistor R1. The second current detector U2 measures total current passing through the resistors R7 and R8 (that is total current of the resistors R7 and R8), and controls the second switch unit 266 to be turned on and turned off, according to the measured total current of the resistors R7 and R8.

When the measured current of the first resistor R1 is less than a first reference value stored in the first current detector U1, the second output pin COUT1 of the first current detector U1 outputs a low level signal, such as logic 0, to the first terminals of the electronic switches Q1 and Q2, the electronic switch Q1 is turned off, and the electronic switches Q2 and Q3 are turned on. The first power supply 5V output from the PSU 100 is transmitted to the load 300 through the first connector 210, the electronic switch Q3, the resistor R1, and the second connector 230. The light-emitting diode D1 is lit to indicate the second connector 230 receives the first power supply 5V.

When the measured current of the first resistor R1 is more than or equal to the first reference, the second output pin COUT1 of the first current detector U1 outputs a high level signal, such as logic 1, to the first terminals of the electronic switches Q1 and Q2, the electronic switch Q1 is turned on, and the electronic switches Q2 and Q3 are turned off. The load 300 does not receive the first power supply 5V from the PSU 100. The light-emitting diode D1 is not lit to indicate the second connector 230 does not receive the first power supply 5V.

When the measured total current of the resistors R7 and R8 is less than a second reference value stored in the second current detector U2, the second output pin COUT1 of the second current detector U2 outputs a high level signal, such as logic 1, to the first terminals of the electronic switches Q4 and Q5, the electronic switch Q4 is turned on, and the electronic switches Q5-Q7 are turned off. The second power supply 12V output from the PSU 100 is transmitted to the load 300 through the first connector 210, the electronic switch Q6, the resistor R7, and the second connector 230, and is transmitted to the load 300 through the first connector 210, the electronic switch Q7, the resistor R8, and the second connector 230. The light-emitting diode D2 is lit to indicate the second connector 230 is receiving the second power supply 12V.

When the measured total current of the resistors R7 and R8 is more than or equal to the second reference value, the second output pin COUT1 of the second current detector U2 outputs a low level signal, such as logic 0, to the first terminals of the electronic switches Q4 and Q5, the electronic switch Q4 is turned off, and the electronic switches Q5-Q7 are turned on. The load 300 does not receive the second power supply 12V from the PSU 100. The light-emitting diode D2 is not lit to indicate the second connector 230 does not receive the second power supply 12V.

In at least one embodiment, reference values stored in different current detectors and corresponding to different power supplies output from the PSU 100 are different. For example, the first reference value corresponding to the first power supply 5V is 5 amps (A), and the second reference value corresponding to the second power supply 12V is 20 A. Therefore, number of electronic switches comprised in the switch units and number of resistors comprised in the resistor units are different, according to reference values corresponding to different power supplies output from the PSU 100.

In at least one embodiment, each of the electronic switches Q1 and Q4 can be an npn-type bipolar junction transistor (BJT), and the first terminal, the second terminal, and the third terminal of each of the electronic switches Q1 and Q4 correspond to a base, a collector, and an emitter of the npn-type BJT, respectively. Each of the electronic switches Q2 and Q5 can be a pnp-type BJT, and the first terminal, the second terminal, and the third terminal of each of the electronic switches Q2 and Q5 correspond to a base, a collector, and an emitter of the pnp-type BJT, respectively. Each of the electronic switches Q3, Q6, and Q7 can be an n-channel metal-oxide semiconductor field-effect transistor (NMOSFET), and the first terminal, the second terminal, and the third terminal of each of the electronic switches Q3, Q6, and Q7 correspond to a gate, a drain, and a source of the NMOSFET, respectively. In other embodiments, each of the electronic switches Q1 and Q4 can be an NMOSFET or other suitable switch having similar functions. Each of the electronic switches Q2 and Q5 can be a p-channel metal-oxide semiconductor field-effect transistor or other suitable switch having similar functions. Each of the electronic switches Q3, Q6, and Q7 can be an npn-type BJT or other suitable switch having similar functions.

As detailed above, when the measured current of the first resistor R1 is more than or equal to the first reference, the first switch unit 226 is turned off by the first current detector U1, to prevent the first power supply 5V output from the PSU 100 from being transmitted to the load 300; and when the measured total current of the resistors R7 and R8 is more than or equal to the second reference value, the second switch unit 266 is turned off by the second current detector U2, to prevent the second power supply 12V output from the PSU 100 from being transmitted to the load 300. Therefore, the electronic device 1000 can prevent the load 300 from being damaged by large current, according to configuring the over-current protection circuit 200 between the PSU 100 and the load 300.

The embodiment shown and described above is only an example. Many details are often found in the art such as the other features of the PSU. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiment described above may be modified within the scope of the claims.

What is claimed is:

1. An over-current protection circuit comprising:
a first connector electrically coupled to a power supply unit (PSU);
a first current measuring unit electrically coupled to the first connector;
a first switch unit electrically coupled to the first connector and the first current measuring unit;
a first resistor unit electrically coupled to the first switch unit and the first current measuring unit; and
a second connector electrically coupled to the first resistor unit;
wherein the first current measuring unit is configured to measure current of the first resistor unit, and to cause the first switch unit to be turned on and turned off according to the measured current of the first resistor unit;
wherein the first current measuring unit is further configured to output a first control signal to the first switch unit, the first switch unit is turned on, and a first power supply output from the PSU is transmitted to the second connector through the first connector, the first switch unit, and the first resistor unit, in event that the measured current of the first resistor unit is less than a first reference value; and
wherein the first current measuring unit is further configured to output a second control signal to the first switch unit, the first switch unit is turned off, and the second connector does not receive the first power supply, in event that the measured current of the first resistor unit is more than or equal to the first reference value;
wherein the first resistor unit comprises a first resistor comprising a first terminal and a second terminal electrically coupled to the second connector; and the first current measuring unit comprising:
a first current detector configured to measure current of the first resistor, and to cause the first switch unit to be turned on and turned off according to the measured current of the first resistor, the first current detector comprising:
a first input pin electrically coupled to the first terminal of the first resistor;

a second input pin electrically coupled to the second terminal of the first resistor; and an output terminal electrically coupled to the first switch unit;

wherein the output terminal of the first current detector outputs the first control signal to the first switch unit, in event that the measured current of the first resistor unit is less than the first reference value; and wherein the output terminal of the first current detector outputs the second control signal to the first switch unit, in event that the measured current of the first resistor unit is more than or equal to the first reference value;

wherein the first switch unit comprises:

a second resistor;

a first electronic switch comprising a first terminal electrically coupled to the output terminal of the first current detector, and electrically coupled to the first connector through the second resistor to receive the first power supply from the PSU, a second terminal electrically coupled to the first connector to receive the first power supply from the PSU, and a third terminal;

a second electronic switch comprising a first terminal electrically coupled to the first terminal of the first electronic switch, a second terminal electrically coupled to a ground; and a third terminal electrically coupled to the third terminal of the first electronic switch; and a third electronic switch comprising a first terminal electrically coupled to the third terminal of the first electronic switch, a second terminal electrically coupled to the first terminal of the first resistor, and a third terminal electrically coupled to the first connector to receive the first power supply from the PSU;

wherein the first electronic switch is turned off, the second electronic switch and the third electronic switch are turned on, and the first power supply output from the PSU is transmitted to the second connector through the first connector, the third electronic switch, and the first resistor, in event that the first terminals of the first electronic switch and the second electronic switch receive the first control signal from the output terminal of the first current detector; and wherein the first electronic switch is turned on, the second electronic switch and the third electronic switch are turned off, and the second connector does not receive the first power supply, in event that the first terminals of the first electronic switch and the second electronic switch receive the second control signal from the output terminal of the first current detector.

2. The over-current protection circuit of claim 1, further comprising a first indication unit comprising:

a third resistor; and a first light-emitting diode comprising an anode electrically coupled to the second connector through the third resistor, and a cathode electrically coupled to a ground;

wherein the first light-emitting diode is lit, in event that the second connector receives the first power supply; and the first light-emitting diode is not lit, in event that the second connector does not receive the first power supply.

3. The over-current protection circuit of claim 1, further comprising:

a second current measuring unit electrically coupled to the first connector;

a second switch unit electrically coupled to the first connector and the second current measuring unit; and a second resistor unit electrically coupled to the second switch unit, the second current measuring unit and the second connector;

wherein the second current measuring unit is configured to measure current of the second resistor unit, and to cause the second switch unit to be turned on and turned off according to the measured current of the second resistor unit;

wherein the second current measuring unit is further configured to output a third control signal to the second switch unit, the second switch unit is turned on, and a second power supply output from the PSU is transmitted to the second connector through the first connector, the second switch unit, and the second resistor unit, in event that the measured current of the second resistor unit is less than a second reference value; and wherein the second current measuring unit is further configured to output a fourth control signal to the second switch unit, the second switch unit is turned off, and the second connector does not receive the second power supply, in event that the measured current of the second resistor unit is more than or equal to the second reference value.

4. The over-current protection circuit of claim 3, wherein the second resistor unit comprises a fourth resistor comprising a first terminal and a second terminal electrically coupled to the second connector, and a fifth resistor comprising a first terminal and a second terminal electrically coupled to the second connector; and the second current measuring unit comprising:

a second current detector configured to measure total current of the fourth resistor and the fifth resistor, and to cause the second switch unit to be turned on and turned off according to the measured total current of the fourth resistor and the fifth resistor, the second current detector comprising:

a first input pin electrically coupled to the first terminal of the fourth resistor and the first terminal of the fifth resistor;

a second input pin electrically coupled to the second terminal of the fourth resistor and the second terminal of the fifth resistor; and an output terminal electrically coupled to the second switch unit;

wherein the output terminal of the second current detector outputs the third control signal to the second switch unit, in event that the measured total current of the fourth resistor and the fifth resistor is less than the second reference value; and wherein the output terminal of the second current detector outputs the fourth control signal to the second switch unit, in event that the measured total current of the fourth resistor and the fifth resistor is more than or equal to the second reference value.

5. The over-current protection circuit of claim 4, wherein the second switch unit comprises:

a sixth resistor;

a fourth electronic switch comprising a first terminal electrically coupled to the output terminal of the second current detector, and electrically coupled to the first connector to receive the second power supply from the PSU, a second terminal electrically coupled to the first connector to receive the second power supply from the PSU, and a third terminal;

a fifth electronic switch comprising a first terminal electrically coupled to the first terminal of the fourth electronic switch, a second terminal electrically coupled to the ground, and a third terminal electrically coupled to the third terminal of fourth electronic switch;

a sixth electronic switch comprising a first terminal electrically coupled to the third terminal of fourth electronic switch, a second terminal electrically coupled to the first terminal of the fourth resistor, and a third terminal electrically coupled to the first connector to receive the second power supply from the PSU;

a seventh electronic switch comprising a first terminal electrically coupled to the third terminal of fourth electronic switch, a second terminal electrically coupled to the first terminal of the fifth resistor, and a third terminal electrically coupled to the first connector to receive the second power supply from the PSU;

wherein the fourth electronic switch is turned off, the fifth to seventh electronic switches are turned on, and the second power supply output from the PSU is transmitted to the second connector through the first connector, the sixth electronic switch, and the fourth resistor, and the second power supply output from the PSU is further transmitted to the second connector through the first connector, the seventh electronic switch, and the fifth resistor, in event that the first terminals of the fourth electronic switch and the fifth electronic switch receive the third control signal from the output terminal of the second current detector; and wherein the fourth electronic switch is turned on, the fifth to seventh electronic switches are turned off, and the second connector does not receive the second power supply, in event that the first terminals of the fourth electronic switch and the fifth electronic switch receive the fourth control signal from the output terminal of the second current detector.

6. The over-current protection circuit of claim 3, further comprising a second indication unit comprising:
   a seventh resistor; and
   a second light-emitting diode comprising an anode electrically coupled to the second connector through the seventh resistor, and a cathode electrically coupled to the ground;
   wherein the second light-emitting diode is lit, in event that the second connector receive the second power supply; and the second light-emitting diode is not lit, in event that the second connector does not receive the second power supply.

7. An electronic device comprising:
   a power supply unit (PSU) configured to output a first power supply and a second power supply;
   a load; and
   an over-current protection circuit comprising:
      a first connector electrically coupled to the PSU;
      a first current measuring unit electrically coupled to the first connector;
      a first switch unit electrically coupled to the first connector and the first current measuring unit;
      a first resistor unit electrically coupled to the first switch unit and the first current measuring unit; and
      a second connector electrically coupled to the first resistor unit;
   wherein the first current measuring unit is configured to measure current of the first resistor unit, and to cause the first switch unit to be turned on and turned off according to the measured current of the first resistor unit;
   wherein the first current measuring unit is further configured to output a first control signal to the first switch unit, the first switch unit is turned on, and the first power supply output from the PSU is transmitted to the second connector through the first connector, the first switch unit, and the first resistor unit, in event that the measured current of the first resistor unit is less than a first reference value; and
   wherein the first current measuring unit is further configured to output a second control signal to the first switch unit, the first switch unit is turned off, and the second connector does not receive the first power supply, in event that the measured current of the first resistor unit is more than or equal to the first reference value;
   wherein the first resistor unit comprises a first resistor comprising a first terminal and a second terminal electrically coupled to the second connector; and the first current measuring unit comprising:
   a first current detector configured to measure current of the first resistor, and to cause the first switch unit to be turned on and turned off according to the measured current of the first resistor, the first current detector comprising:
      a first input pin electrically coupled to the first terminal of the first resistor;
      a second input pin electrically coupled to the second terminal of the first resistor; and
      an output terminal electrically coupled to the first switch unit;
   wherein the output terminal of the first current detector outputs the first control signal to the first switch unit, in event that the measured current of the first resistor unit is less than the first reference value; and
   wherein the output terminal of the first current detector outputs the second control signal to the first switch unit, in event that the measured current of the first resistor unit is more than or equal to the first reference value;
   wherein the first switch unit comprises:
   a second resistor;
   a first electronic switch comprising a first terminal electrically coupled to the output terminal of the first current detector, and electrically coupled to the first connector through the second resistor to receive the first power supply from the PSU, a second terminal electrically coupled to the first connector to receive the first power supply from the PSU, and a third terminal;
   a second electronic switch comprising a first terminal electrically coupled to the first terminal of the first electronic switch, a second terminal electrically coupled to a ground; and a third terminal electrically coupled to the third terminal of the first electronic switch; and
   a third electronic switch comprising a first terminal electrically coupled to the third terminal of the first electronic switch, a second terminal electrically coupled to the first terminal of the first resistor, and a third terminal electrically coupled to the first connector to receive the first power supply from the PSU;
   wherein the first electronic switch is turned off, the second electronic switch and the third electronic switch are turned on, and the first power supply output from the PSU is transmitted to the second connector through the first connector, the third electronic switch, and the first resistor, in event that the first terminals of the first electronic switch and the second electronic switch receive the first control signal from the output terminal of the first current detector; and
   wherein the first electronic switch is turned on, the second electronic switch and the third electronic switch are turned off, and the second connector does not receive the first power supply, in event that the first terminals of the first electronic switch and the second electronic switch receive the second control signal from the output terminal of the first current detector.

8. The electronic device of claim 7, wherein the overcurrent protection circuit further comprises a first indication unit comprising:
a third resistor; and
a first light-emitting diode comprising an anode electrically coupled to the second connector through the third resistor, and a cathode electrically coupled to a ground;
wherein the first light-emitting diode is lit, in event that the second connector receives the first power supply; and the first light-emitting diode is not lit, in event the second connector does not receive the first power supply.

9. The electronic device of claim 7, wherein the overcurrent protection circuit further comprises:
a second current measuring unit electrically coupled to the first connector;
a second switch unit electrically coupled to the first connector and the second current measuring unit; and
a second resistor unit electrically coupled to the second switch unit, the second current measuring unit and the second connector;
wherein the second current measuring unit is configured to measure current of the second resistor unit, and to cause the second switch unit to be turned on and turned off according to the measured current of the second resistor unit;
wherein the second current measuring unit is further configured to output a third control signal to the second switch unit, the second switch unit is turned on, and a second power supply output from the PSU is transmitted to the second connector through the first connector, the second switch unit, and the second resistor unit, in event that the measured current of the second resistor unit is less than a second reference value; and
wherein the second current measuring unit is further configured to output a fourth control signal to the second switch unit, the second switch unit is turned off, and the second connector does not receive the second power supply, in event that the measured current of the second resistor unit is more than or equal to the first reference value.

10. The electronic device of claim 9, wherein the second resistor unit comprises a fourth resistor comprising a first terminal and a second terminal electrically coupled to the second connector, and a fifth resistor comprising a first terminal and a second terminal electrically coupled to the second connector; and the second current measuring unit comprising:
a second current detector configured to measure total current of the fourth resistor and the fifth resistor, and to cause the second switch unit to be turned on and turned off according to the measured total current of the fourth resistor and the fifth resistor, the second current detector comprising:
a first input pin electrically coupled to the first terminal of the fourth resistor and the first terminal of the fifth resistor;
a second input pin electrically coupled to the second terminal of the fourth resistor and the second terminal of the fifth resistor; and
an output terminal electrically coupled to the second switch unit;

wherein the output terminal of the second current detector outputs the third control signal to the second switch unit, in event the measured total current of the fourth resistor and the fifth resistor is less than the second reference value; and
wherein the output terminal of the second current detector outputs the fourth control signal to the second switch unit, in event that the measured total current of the fourth resistor and the fifth resistor is more than or equal to the second reference value.

11. The electronic device of claim 10, wherein the second switch unit comprises:
a sixth resistor;
a fourth electronic switch comprising a first terminal electrically coupled to the output terminal of the second current detector, and electrically coupled to the first connector to receive the second power supply from the PSU, a second terminal electrically coupled to the first connector to receive the second power supply from the PSU, and a third terminal;
a fifth electronic switch comprising a first terminal electrically coupled to the first terminal of the fourth electronic switch, a second terminal electrically coupled to the ground, and a third terminal electrically coupled to the third terminal of fourth electronic switch;
a sixth electronic switch comprising a first terminal electrically coupled to the third terminal of fourth electronic switch, a second terminal electrically coupled to the first terminal of the fourth resistor, and a third terminal electrically coupled to the first connector to receive the second power supply from the PSU;
a seventh electronic switch comprising a first terminal electrically coupled to the third terminal of fourth electronic switch, a second terminal electrically coupled to the first terminal of the fifth resistor, and a third terminal electrically coupled to the first connector to receive the second power supply from the PSU;
wherein the fourth electronic switch is turned off, the fifth to seventh electronic switches are turned on, and the second power supply output from the PSU is transmitted to the second connector through the first connector, the sixth electronic switch, and the fourth resistor, and the second power supply output from the PSU is further transmitted to the second connector through the first connector, the seventh electronic switch, and the fifth resistor, in event that the first terminals of the fourth electronic switch and the fifth electronic switch receive the third control signal from the output terminal of the second current detector; and
wherein the fourth electronic switch is turned on, the fifth to seventh electronic switches are turned off, and the second connector does not receive the second power supply, in event that the first terminals of the fourth electronic switch and the fifth electronic switch receive the fourth control signal from the output terminal of the second current detector.

12. The electronic device of claim 9, wherein the overcurrent protection circuit further comprises a second indication unit comprising:
a seventh resistor; and
a second light-emitting diode comprising an anode electrically coupled to the second connector through the seventh resistor, and a cathode electrically coupled to the ground;
wherein the second light-emitting diode is lit, in event that the second connector receives the second power supply; and the second light-emitting diode is not lit, in event that the second connector does not receive the second power supply.

* * * * *